(12) United States Patent
Endo et al.

(10) Patent No.: US 7,365,452 B2
(45) Date of Patent: Apr. 29, 2008

(54) SENSOR DEVICE AND OUTPUT CHARACTERISTIC SWITCHING METHOD OF SENSOR DEVICE

(75) Inventors: Noboru Endo, Okazaki (JP); Yasuaki Makino, Okazaki (JP)

(73) Assignee: DENSO CORPORATION, Kariya (JP)

( * ) Notice: Subject to any disclaimer, the term of this patent is extended or adjusted under 35 U.S.C. 154(b) by 817 days.

(21) Appl. No.: 10/686,615

(22) Filed: Oct. 17, 2003

(65) Prior Publication Data
US 2004/0083834 A1    May 6, 2004

(30) Foreign Application Priority Data
Oct. 18, 2002    (JP)    ............... 2002-304669

(51) Int. Cl.
*H01L 29/84* (2006.01)
*G01D 3/024* (2006.01)

(52) U.S. Cl. ..................... 307/112; 73/866.1
(58) Field of Classification Search ................ 307/112; 73/866.1, 1.88, 1.61
See application file for complete search history.

(56) References Cited

U.S. PATENT DOCUMENTS

| | | | |
|---|---|---|---|
| 2,994,812 A * | 8/1961 | Spencer et al. | 318/604 |
| 3,321,744 A * | 5/1967 | Jensen | 340/825.23 |
| 3,676,839 A * | 7/1972 | Wohl et al. | 367/122 |
| 4,155,041 A * | 5/1979 | Burns et al. | 455/501 |
| 4,344,492 A * | 8/1982 | Hirano | 177/25.18 |
| 5,801,352 A * | 9/1998 | Taneda et al. | 219/69.18 |
| 6,054,890 A * | 4/2000 | Giacomo | 327/375 |
| 6,107,992 A * | 8/2000 | Ishigaki | 345/158 |
| 6,343,498 B1 | 2/2002 | Oba et al. | 73/1.57 |
| 6,715,348 B2 | 4/2004 | Mokuo | 73/299 |
| 6,826,503 B2 | 11/2004 | Makino et al. | 702/104 |
| 7,253,695 B2 * | 8/2007 | Matsuura | 331/176 |

FOREIGN PATENT DOCUMENTS

| | | | |
|---|---|---|---|
| EP | 260474 A1 * | 3/1988 | |
| EP | 0 747 672 A1 | 12/1996 | |
| EP | 0 845 660 A1 | 6/1998 | |

(Continued)

OTHER PUBLICATIONS

Notice of Reason for Rejection from Japanese Patent Office for corresponding Japanese patent application No. 2002-304669 dated Apr. 17, 2007.

*Primary Examiner*—Thomas P. Noland
(74) *Attorney, Agent, or Firm*—Posz Law Group, PLC

(57) ABSTRACT

A pressure sensor device (1) includes a sensing element (2) for sending an analog signal according to pressure. The pressure sensor device (1) outputs the analog voltage to a microcomputer (20) through an input-output terminal (8). An input-output control circuit (4) monitors the voltage value in the input-output terminal (8). When the voltage of the input-output terminal (8) is set to high by the microcomputer (20) and is dislocated from a predetermined range, the input-output control circuit (4) functionally changes the input-output terminal (8) outputting a detecting signal to a terminal for inputting an external signal from the microcomputer. After the input-output terminal (8) is changed to the terminal for inputting the external signal, a range control circuit (7) fetches an external command signal through the input-output terminal (8) and switches the output characteristics.

14 Claims, 11 Drawing Sheets

FOREIGN PATENT DOCUMENTS

| | | | |
|---|---|---|---|
| JP | A-58-198717 | 11/1983 | |
| JP | A-63-248181 | 10/1988 | ................ 257/417 |
| JP | A-H04-370729 | 12/1992 | |
| JP | A-H06-229862 | 8/1994 | |
| JP | 2000270482 A * | 9/2000 | |
| JP | B2-3198773 | 6/2001 | |
| JP | A-2001-244481 | 9/2001 | |

* cited by examiner

SENSOR DEVICE AND OUTPUT CHARACTERISTIC SWITCHING METHOD OF SENSOR DEVICE

CROSS REFERENCE TO RELATED APPLICATIONS

This application is based upon, claims the benefit of priority of, and incorporates by reference the contents of Japanese Patent Application No. 2002-304669 filed Oct. 18, 2002.

BACKGROUND OF THE INVENTION

1. Field of the Invention

The present invention relates to a sensor device and an output characteristic switching method of the sensor device.

2. Description of the Related Art

A conventional pressure sensor device generally has one appropriate range with respect to the pressure range of a measured object.

However, for example, when the pressures of different ranges are detected with high accuracy at the time of a leak inspection executed in a sensor arrangement and the actual using time of the sensor device actually used in a system, the difference in the pressure of a measured object is large. Therefore, it is necessary to have two ranges in one sensor device.

In the pressure sensor device for coping with plural ranges, as shown in FIG. 10, upper and lower limit voltages are set in the relation of a pressure value and an output voltage and a returning operation is performed plural times therebetween. Thus, the pressure can be detected in the same resolution as small pressure even in the case of large pressure.

Otherwise, as shown in FIG. 11, a reference voltage setting terminal is arranged, and an analog voltage is inputted from an external device (a microcomputer, etc.). Thus, as shown in FIG. 12, characteristic lines every reference voltage are switched, and the pressure of a wide range can be detected in the same resolution.

However, in the case of FIG. 10, no actual pressure can be distinguished from the sensor output. Therefore, a problem exists in that there is a limit of the use. Namely, since the pressure value is indefinite from only the output voltage, it is necessary to specify the pressure value by further using another information from an external device (microcomputer, etc.). Further, in the cases of FIGS. 11 and 12, problems exist in that a DA converter is required in the external device (microcomputer, etc.) to set the reference voltage, and it is necessary to increase the number of dedicated wirings (reference voltage lines) by one.

SUMMARY OF THE INVENTION

The present invention is made under such a background, and its object is to be able to easily detect the value of a measured object while the output characteristics are switched.

In accordance with the output characteristic switching method of the sensor device of an aspect according to the invention, at least a terminal for receiving the supply of a power voltage or outputting a detecting signal is functionally changed to a terminal for inputting a signal from the exterior. In this state, an external command signal is fetched through this changed terminal and output characteristics are switched. Thus, in comparison with the conventional case, the output characteristics are switched without increasing the number of wirings (terminals). As a result, the value of a measured object can be easily detected while the output characteristics are switched.

In another aspect according to the invention, when the above external command signal is a digital signal, it is not necessary to use a DA converter in comparison with the conventional case (FIGS. 11 and 12), which is practically preferable.

Further, in accordance with further aspects of the inventions as the sensor device, when the voltage value in the terminal is monitored by the terminal function changing device and is dislocated from a predetermined range, the predetermined terminal is functionally changed to a terminal for inputting an external signal. After the predetermined terminal is changed to the terminal for inputting the external signal, an external command signal is fetched through the changed terminal and the output characteristics are switched by the output characteristic switching device. Thus, in comparison with the conventional case, the output characteristics are switched without increasing the number of wirings (terminals). As a result, the value of the measured object can be easily detected while the output characteristics are switched.

In a further aspect according to the invention, when the above external command signal is a digital signal, it is not necessary to use a DA converter in comparison with the conventional case (FIGS. 11 and 12), which is practically preferable.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF THE PREFERRED EMBODIMENTS

Figure 1:
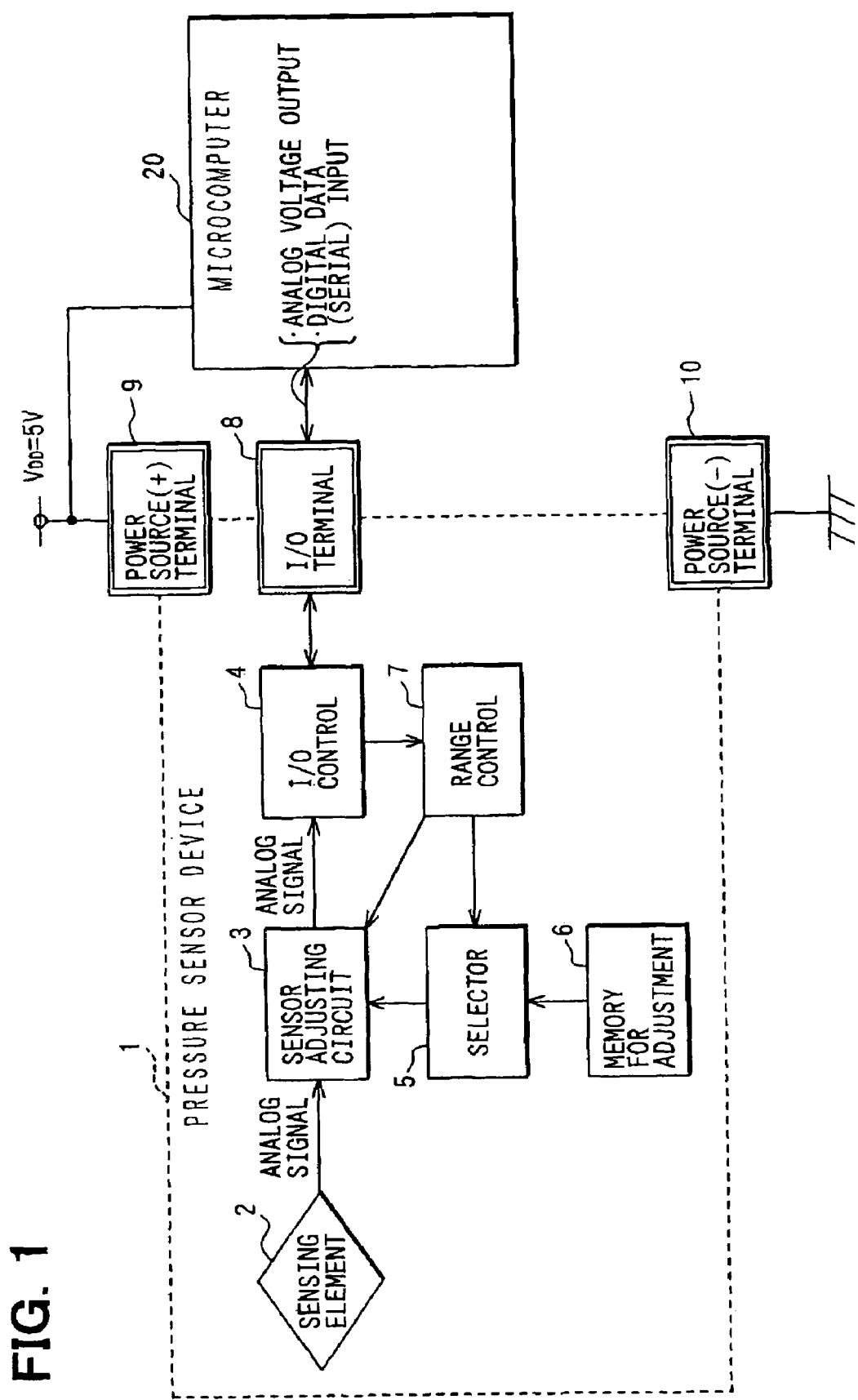
FIG. 1 is a block diagram of the sensor device according to a first preferred embodiment.

The following description of the preferred embodiment(s) is merely exemplary in nature and is in no way intended to limit the invention, its application, or uses.

First Embodiment Mode

Referring to the block diagram of FIG. 1, a first preferred embodiment of the system will be discussed. This system has a pressure sensor device 1. This pressure sensor device 1 mutually communicates with a microcomputer 20 for controlling the entire operation of the system.

The pressure sensor device 1 has a sensing element 2, a sensor adjusting circuit 3, an input-output control circuit 4, a selector 5, memory 6 for an adjustment, a range control circuit 7, an input-output terminal 8, a positive power source terminal 9 and a negative power source terminal 10. A high voltage side power source terminal (VDD) is connected to the positive power source terminal 9, and the negative power source terminal 10 is connected to the ground. Namely, the pressure sensor device 1 receives the supply of a power voltage VDD. The high voltage side power voltage VDD is set to 5 volts. Further, the microcomputer 20 is connected to the input-output terminal 8 of the pressure sensor device 1. Further, the high voltage side power source terminal (VDD) is connected to the microcomputer 20.

In the pressure sensor device 1, the sensing element 2 is preferably implemented by a semiconductor pressure sensor such as a Piezo resistance type, etc., and outputs an analog signal according to a detected pressure. More specifically, for example, the semiconductor pressure sensor of the Piezo resistance type has a diaphragm (thin wall portion) formed in a silicon substrate by micro machining processing, and a Piezo resistance gauge formed in this diaphragm by impurity diffusion. Here, the analog signal in the sensing element 2 is generally a small signal and has temperature characteristics and an offset. Further, these may have error factor resulting from, for example, individual product variation.

The sensor adjusting circuit 3 inputs the analog signal according to the pressure from the sensing element 2, and makes offset, temperature characteristic adjustments, etc. in addition to amplification processing. Concretely, in the sensor adjusting circuit 3, the analog signal is amplified, and the error factor of the analog signal provided by the sensing element 2 is changed to a predetermined pressure function according to a specification. Data relating to this processing are stored to the memory 6 for an adjustment. At a sensing operation time, the data of the memory 6 for an adjustment are sent to the sensor adjusting circuit 3 through the selector 5, and processing (adjustment) according to this data is performed in the sensor adjusting circuit 3. A nonvolatile memory such as an EPROM, etc., a fuse, etc. are used in the memory 6 for an adjustment.

The input-output control circuit 4 is connected to the sensor adjusting circuit 3 and the input-output terminal 8. At a detecting signal output mode time, the input-output control circuit 4 inputs the analog signal (analog voltage signal) from the sensor adjusting circuit 3 and sends this analog signal to the input-output terminal 8. Namely, the input-output control circuit 4 outputs a detecting signal obtained by a change in voltage component from the input-output terminal 8.

The range control circuit 7 is connected to the input-output control circuit 4. The input-output control circuit 4 further monitors the voltage value in the input-output terminal 8. When a sensor device side input waiting mode described later is attained on the basis of this voltage monitor, the range control circuit 7 fetches digital data sent from the microcomputer 20 through the input-output terminal 8 and the input-output control circuit 4. The range control circuit 7 then selects the data of the memory 6 for an adjustment according to the range provided by the digital data through the selector 5.

Figure 2:
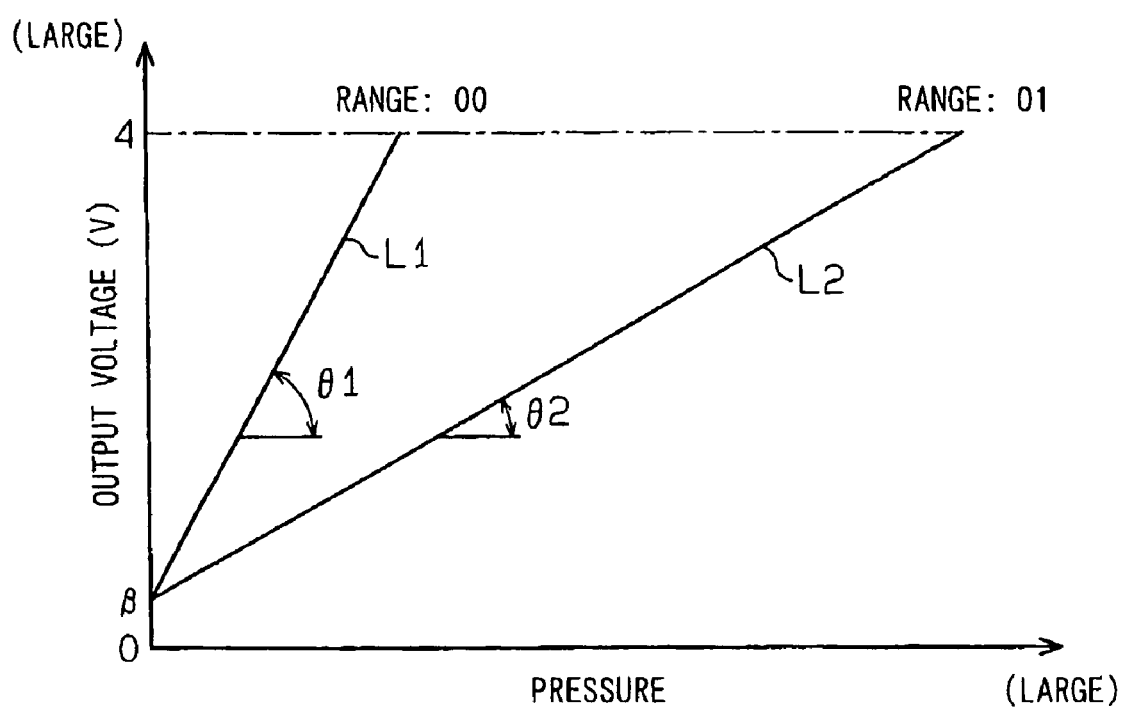
FIG. 2 depicts a characteristic graph showing the relationship between pressure and output voltage.

FIG. 2 shows the range in the pressure sensor device 1, i.e., output characteristics (L1, L2), and also shows the relation of the pressure and the output voltage. The characteristic lines L1, L2 are represented by linear functions. In the characteristic lines L1, L2, both intercepts are β, and the inclination θ of the characteristic line L1 is θ1, and the inclination θ of the characteristic line L2 is θ2 (<θ1). When the data sent from the microcomputer 20 is "00" in binary number, low pressure can be detected by using the characteristic line L1. Further, when the data sent from the microcomputer 20 is "01" in binary number, high pressure can be detected by using the characteristic line L2.

The operation of the pressure sensor device 1 will next be explained.

Figure 3:
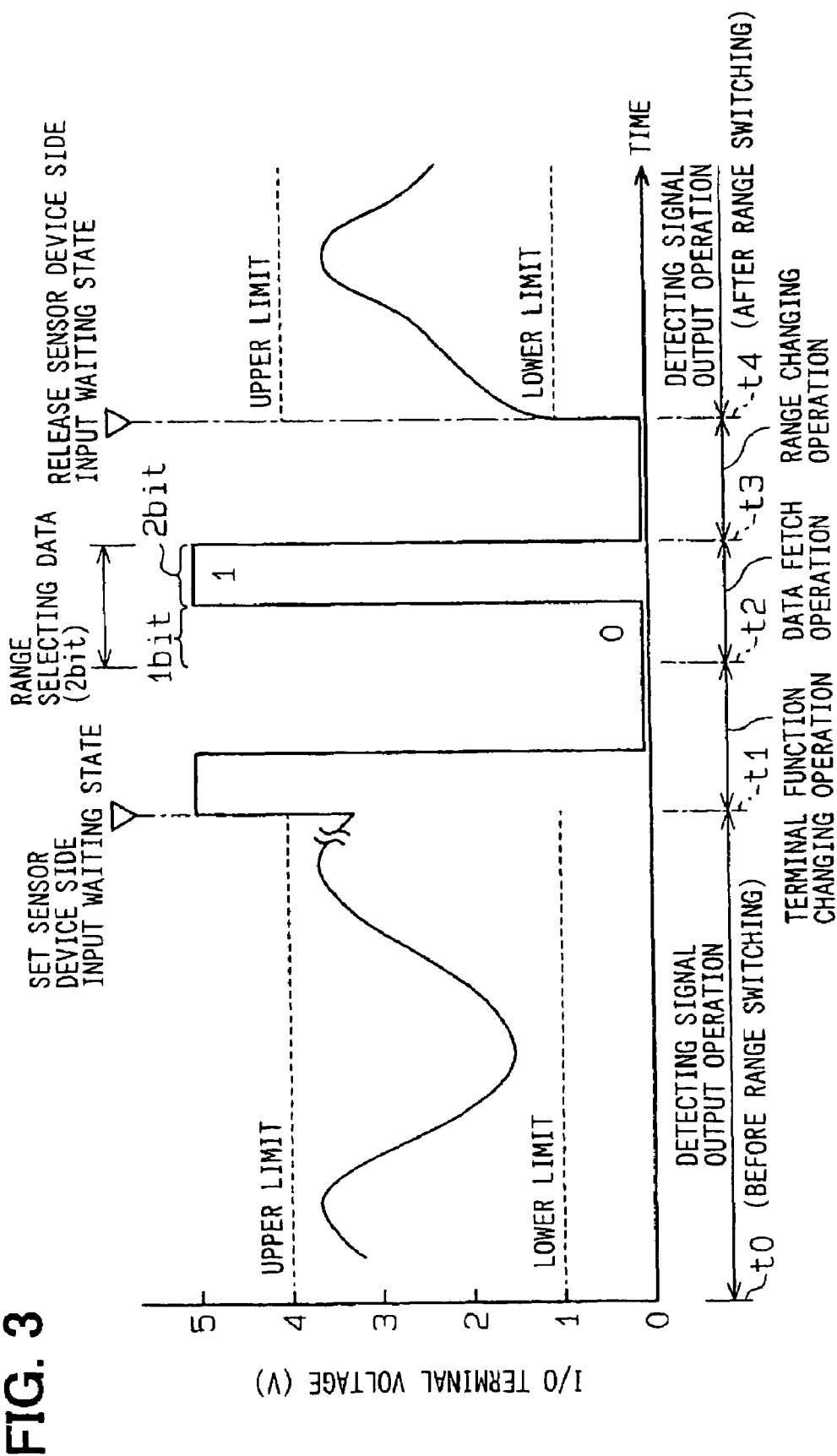
FIG. 3 is a time chart for explaining operation of a sensor device.

FIG. 3 is a time chart for explaining this operation. The axis of ordinate shows the voltage at the input-output terminal 8 of FIG. 1, and the axis of abscissa shows time.

In FIG. 3, when the high pressure side power voltage VDD=5 volts is set, the output operation of a detected signal is performed in a period (detecting signal output operating mode) of t0 to t1, and the result sensed in a range from 1 volt to 4 volts is outputted as an analog voltage value. Namely, the terminal 8 is used as a signal output terminal.

At the timing of t1, the microcomputer 20 compulsorily sets the voltage of the input-output terminal 8 of FIG. 1 to 5 volts. The input-output control circuit 4 detects this voltage by using a comparator, etc., and changes from the detecting signal output operating mode to a sensor device side input waiting mode. In a period of t1 to t2 of FIG. 3, the input-output control circuit 4 performs an operation for changing a terminal function, and changes the function of the terminal 8 from the signal output terminal to a signal input terminal. Namely, the input-output terminal 8 is set to an input waiting state and the sensor output is interrupted.

Thereafter, in a period of t2 to t3 of FIG. 3, the range control circuit 7 executes a data fetch operation. Namely, the range control circuit 7 fetches range selecting data (a digital signal for determining the range) of two bits sent from the microcomputer 20 through the terminal 8. In the range selecting data of two bits, the L-level is set to zero volt and the H-level is set to 5 volts. In the period of t2 to t3 of FIG. 3, it shows a case in which "01" in binary number is inputted. Thus, the pressure sensor device 1 inputs the range selecting data by using the digital signal by means of serial communication with the microcomputer 20.

Then, the contents of the digital signal from the microcomputer 20 are discriminated in the range control circuit 7.

In a period of t3 to t4 of FIG. 3, the range control circuit 7 performs a switching operation to the characteristic lines (ranges) L1, L2 requested from the microcomputer 20 by the data from the microcomputer 20.

Concretely, the range control circuit 7 reads required data among the data in the memory 6 for an adjustment through the selector 5 so as to set a sensor output in the range requested from the microcomputer 20, and changes the connecting state of an analog circuit (OP amplifier, etc.) within the sensor adjusting circuit 3. For example, the range control circuit 7 changes the gain of an amplifying circuit.

A method for dividing a memory area into every range and reading only an object area may be also used except for the selecting method using the selector 5.

When the range is switched, the sensor device side input waiting state is released in timing of t4 of FIG. 3. Thereafter, the detecting signal output operating mode is set and the output operation of the detecting signal is performed and the analog voltage according to the pressure is outputted from the terminal 8. Namely, the result sensed in the range from 1 volt to 4 volts is outputted as an analog voltage value.

Thus, the pressure can be detected in plural ranges without increasing the number of DA converters and wirings. Accordingly, the pressure detection can be performed in the plural ranges at low cost.

This embodiment mode has the following features as mentioned above.

(A) As the output characteristic switching method of the pressure sensor device, in the period of t1 to t2 of FIG. 3, the terminal 8 for outputting the detecting signal is functionally changed to a terminal for inputting a signal from the exterior. In this state, in the period of t2 to t3 of FIG. 3, the range selecting data as an external command signal is fetched through this terminal 8. In the period of t3 to t4, the output characteristics (ranges) are switched. Thus, in comparison with the conventional case, the output characteristics (ranges) are switched without increasing the number of wirings (terminals). Further, since the used range is known in the microcomputer 20, the pressure value can be specified from the detecting signal (output value) of the pressure sensor device 1. Thus, the value of a measured object can be easily detected while the output characteristics (ranges) are switched.

Figure 11:
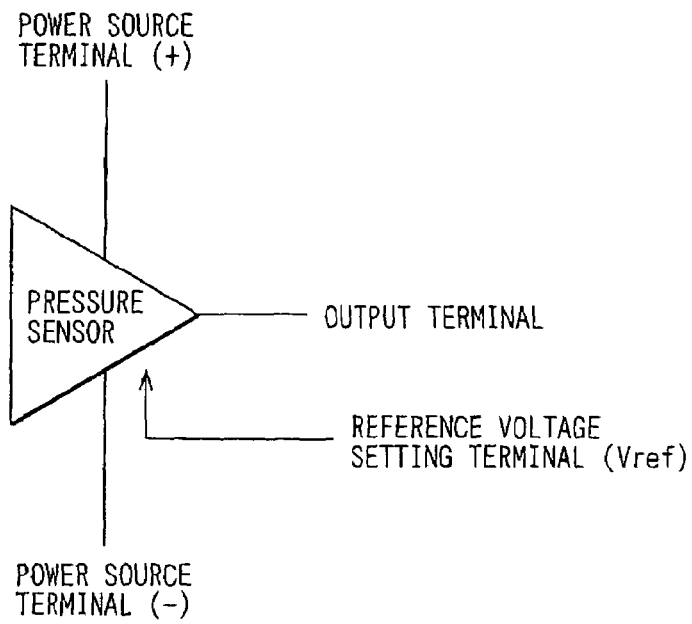
FIG. 11 is a schematic diagram of a related art reference voltage setting terminal.
Figure 12:
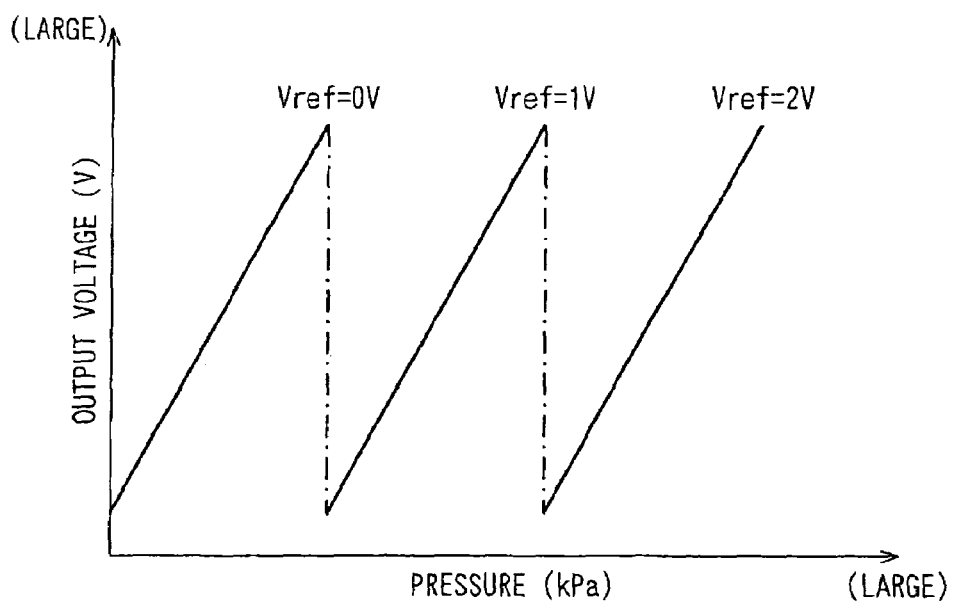
FIG. 12 is a characteristic graph showing the relation between pressure and output voltage for a related art device.

Since the range selecting data as the external command signal is a digital signal, it results in the advantage of eliminating the requirement to use a DA converter in comparison with the conventional case (FIGS. 11 and 12).

The function of the terminal (9) for power voltage supply may also be changed to a terminal for an external signal input instead of the construction that the function of the terminal (8) for the detecting signal output in FIG. 1 is changed to the terminal for the external signal input (a detailed explanation will be made in a fourth embodiment mode using FIG. 8). In short, it is sufficient to functionally change at least the terminal for receiving the supply of the power voltage or outputting the detecting signal to a terminal for inputting a signal from the exterior, and fetch the external command signal through this changed terminal in this state and switch the output characteristics.

(B) The terminal 8, the terminal function changing device (input-output control circuit 4) and the output characteristic switching device (range control circuit 7) are arranged as the pressure sensor device. The terminal 8 outputs the detecting signal provided by a change in voltage component. When the voltage value in the terminal 8 is monitored and dislocated from a predetermined range, the terminal function changing device functionally changes this terminal B to a terminal for inputting an external signal. After the terminal 8 is changed to the terminal for inputting the external signal, the output characteristic switching device fetches the external command signal through this terminal 8 and switches the output characteristics. Thus, the method of (A) can be embodied.

In FIG. 2, in the ranges (characteristic lines L1, L2) as the output characteristics, the inclinations (sensitivities) θ of linear functions are set to be different from each other. Instead of this, the intercepts (offset voltages) β of linear functions may also be set to be different from each other in the ranges (characteristic lines L1, L2). FIG. 2 shows the case that the two characteristic lines L1, L2 (two ranges) are used. However, more characteristic lines L1, L2 (ranges) may be also set.

Second Embodiment Mode

A second preferred embodiment will now be explained with emphasis on the differences between the first and second embodiments.

Figure 4:
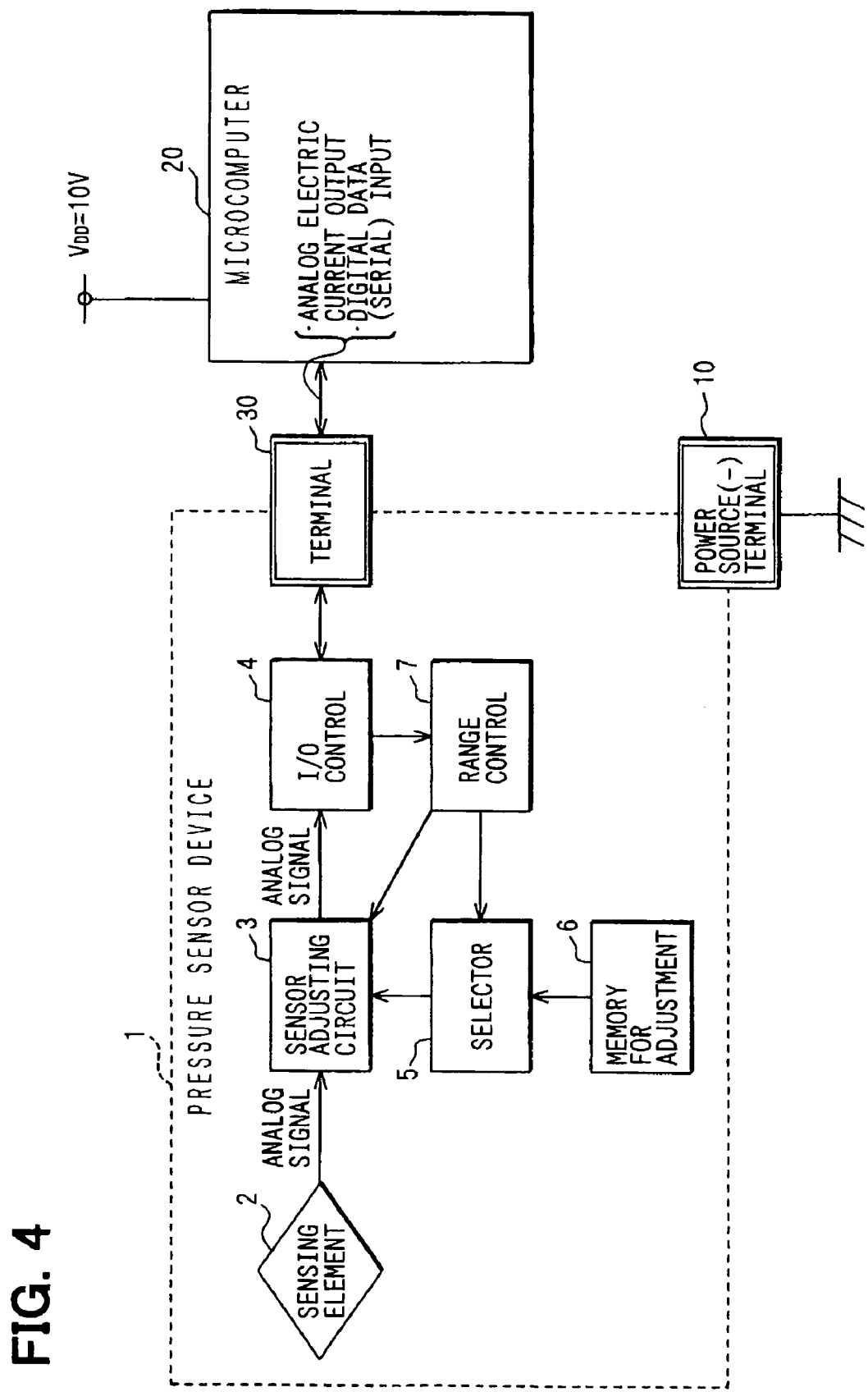
FIG. 4 is a block diagram of the sensor device according to a second preferred embodiment.
Figure 5:
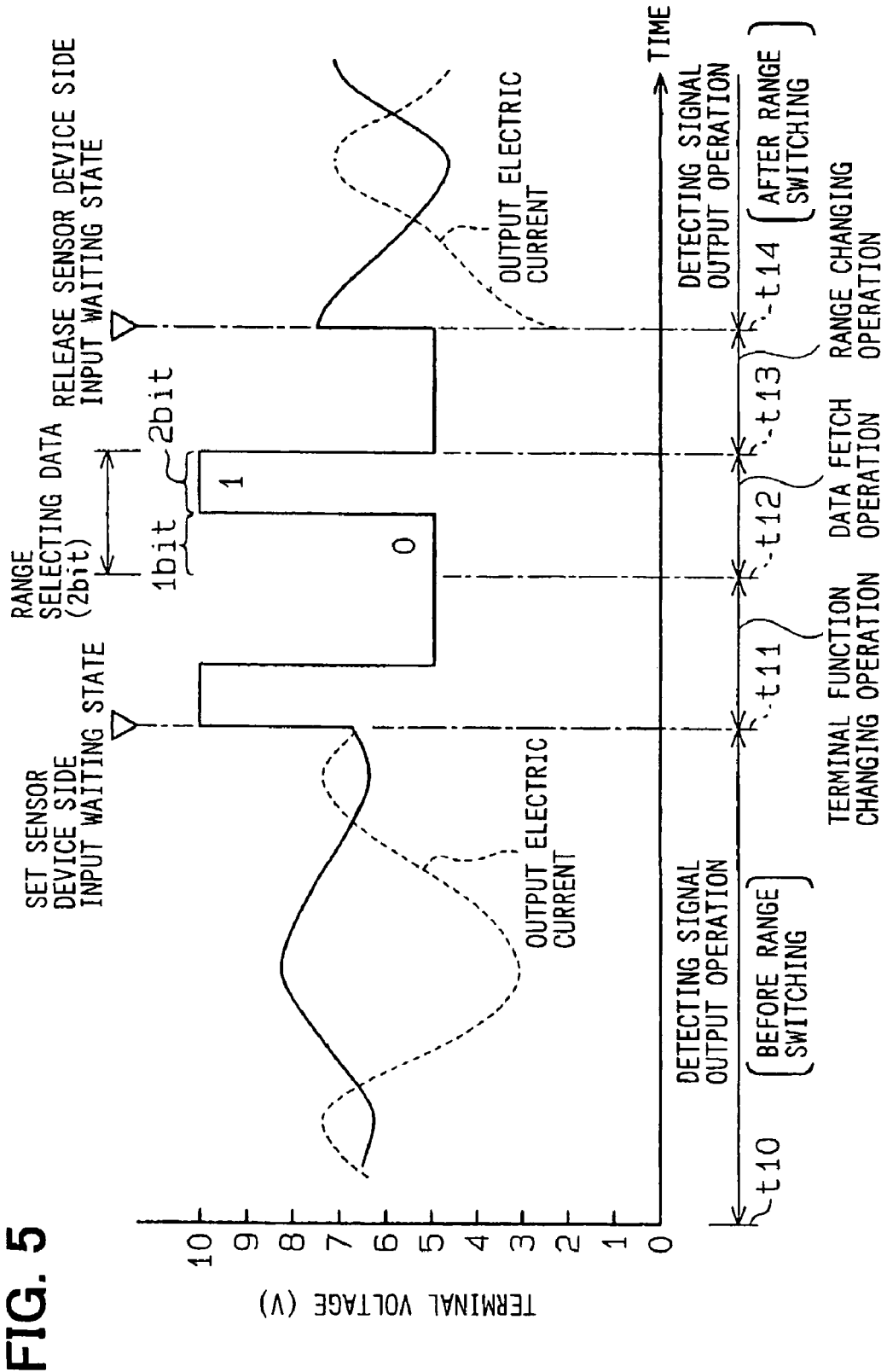
FIG. 5 is a time chart for explaining the operation of a sensor device.

FIG. 4 shows the construction of a system in this embodiment mode instead of FIG. 1. FIG. 5 shows a time chart in this embodiment mode instead of FIG. 3.

In the first embodiment mode, the pressure sensor device of the three-terminal structure using the analog voltage as a sensor output is embodied. However, in this embodiment mode, the pressure sensor device of a two-terminal structure using an analog electric current as the sensor output is embodied.

In FIG. 4, the pressure sensor device 1 has a terminal 30 and a negative power source terminal 10. Further, a microcomputer 20 is connected to the terminal 30 of the pressure sensor device 1. A high voltage side power source terminal (VDD) is connected to the microcomputer 20, and the high voltage side power voltage VDD is set to 10 volts. The negative power source terminal 10 is connected to the ground.

The terminal 30 is a terminal for receiving the supply of a power voltage from the microcomputer 20, and outputting a detecting signal provided by a change in electric current component to the microcomputer 20. Namely, a pressure value sensed through the terminal 30 is outputted by an analog electric current from the pressure sensor device 1 to the microcomputer 20.

The operation of the pressure sensor device 1 will next be explained by using the time chart of FIG. 5. The axis of ordinate of FIG. 5 shows the voltage at the terminal 30 of FIG. 4.

When the high voltage side power voltage VDD=10 volts is set, a detecting signal output operation is performed in a period of t10 to t11 of FIG. 5 and the result sensed in a range from 2 volts to 8 volts is outputted as the analog electric current.

When the timing of t11 of FIG. 5 is attained, the microcomputer 20 compulsorily sets the voltage of the terminal 30 of FIG. 4 to 10 volts. In the pressure sensor device 1, the input-output control circuit 4 as a terminal function changing device monitors the voltage value in the terminal 30, and detects this change, i.e., that the voltage value of the terminal 30 is dislocated from a predetermined range. The input-output control circuit 4 switches to a sensor device side input waiting mode from the detecting signal output operating mode. Further, in a period of t11 to t12 of FIG. 5, the input-output control circuit 4 performs an operation for changing the terminal function, and functionally changes the terminal 30 to a terminal for inputting an external signal from a signal output terminal. Namely, the terminal 30 is set to an input waiting state and the sensor output is interrupted.

After the terminal 30 is changed to the terminal for inputting the external signal, the range control circuit 7 as an output characteristic switching device executes a data fetch operation in a period of t12 to t13 of FIG. 5. Namely, the range control circuit 7 fetches range selecting data (external command signal) of two bits sent from the microcomputer 20 through the terminal 30. In the range selecting data of two bits, the L-level is set to 5 volts and the H-level is set to 10 volts. In the period of t12 to t13 of FIG. 5, it shows a case in which "01" in binary number is inputted.

The range control circuit 7 changes (switches) the output characteristics, i.e., the characteristic lines (ranges) L1, L2 by this data from the microcomputer 20 in a period of t13 to t14 of FIG. 5.

Thereafter, the sensor device side input waiting state is released in the timing of t14 of FIG. 5. After that, a detecting signal output operating mode is attained and a pressure detecting operation is performed in a state in which the ranges are switched. The result sensed in a range from 2 volts to 8 volts is outputted as an analog electric current value.

Thus, a high voltage is supplied from the microcomputer 20 side in the timing of t11 of FIG. 5 so that this high voltage is discriminated within the pressure sensor device 1, and the sensor device side input waiting mode is set. Digital data is constructed by changing the supply voltage from the microcomputer 20 to the pressure sensor device 1 at a binary value. After the range setting is completed, the consumed electric current is changed in accordance with the pressure, and is sent to the microcomputer 20 side by performing electric current communication.

Third Embodiment Mode

A third preferred embodiment will now be explained with emphasis on the differences between the first and third embodiments.

Figure 6:
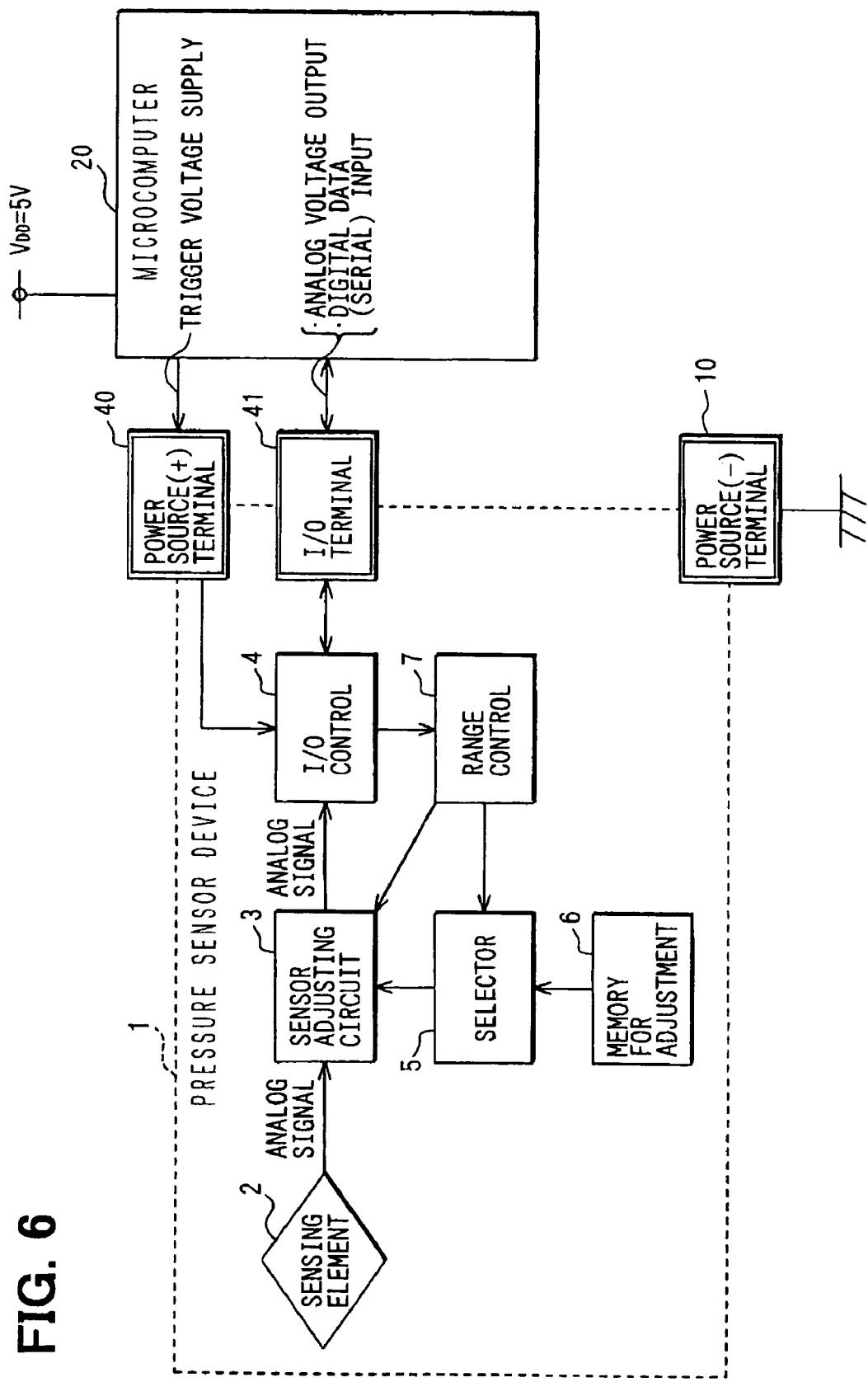
FIG. 6 is a block diagram of the sensor device according to a third preferred embodiment.
Figure 7:
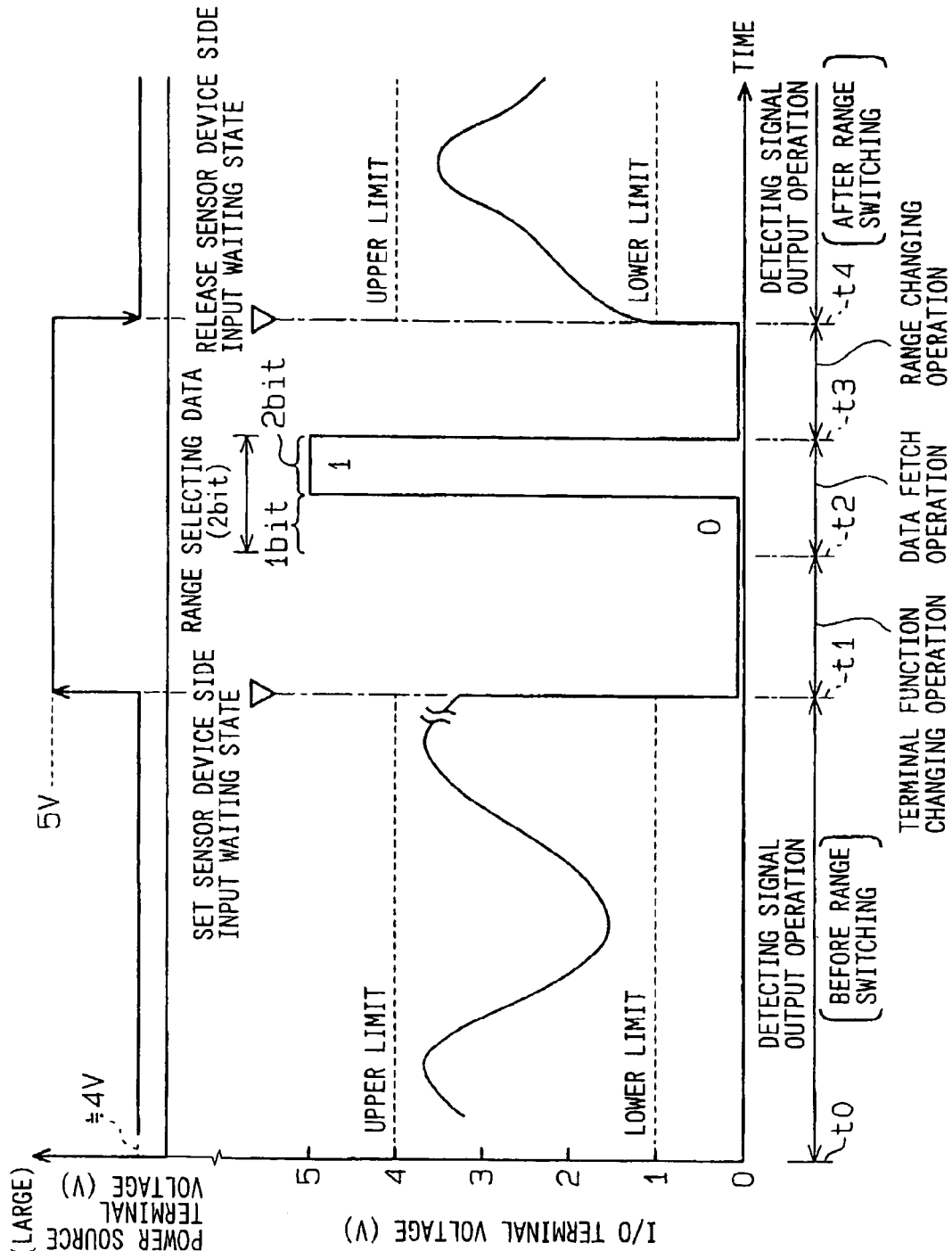
FIG. 7 is a time chart for explaining the operation of a sensor device.

FIG. 6 shows the construction of a system in this embodiment mode instead of FIG. 1. FIG. 7 shows a time chart in this embodiment mode instead of FIG. 3.

As shown in FIG. 6, a high voltage side power source terminal (VDD) is connected to a microcomputer 20. The high voltage side power voltage VDD is set to 5 volts. A first terminal (positive power source terminal) 40 in the pressure sensor device 1 is a terminal for receiving the supply of a power voltage, and is connected to the microcomputer 20. A second terminal (input-output terminal) 41 in the pressure sensor device 1 is a terminal for outputting a detecting signal provided by a change in voltage component, and is connected to the microcomputer 20.

The axis of ordinate of FIG. 7 shows the voltage at the first terminal (positive power source terminal) 40 and the voltage at the second terminal (input-output terminal) 41 of FIG. 6.

In a period of t0 to t1 of FIG. 7, the pressure sensor device 1 performs a detecting signal output operation while the pressure sensor device 1 receives the supply of 4 volts as the power voltage from the microcomputer 20 through the first terminal (power source terminal) 40. At this time, an analog voltage is outputted as the detecting signal from the second terminal (input-output terminal) 41 to the microcomputer 20.

Thereafter, in the timing of t1 of FIG. 7, the microcomputer 20 changes the voltage of the first terminal (power source terminal) 40 from 4 volts set so far to 5 volts. The input-output control circuit 4 as a terminal function changing device of FIG. 6 monitors the voltage value in the first terminal (power source terminal) 40. When the voltage value is dislocated from a predetermined range by changing the voltage value from 4 volts to 5 volts, the input-output control circuit 4 functionally changes the second terminal (input-output terminal) 41 to a terminal for inputting an external signal in a period of t1 to t2.

After the second terminal 41 is changed to the terminal for inputting the external signal, the range control circuit 7 as an output characteristic switching device fetches range selecting data of two bits through the terminal 41 in a period of t2 to t3 of FIG. 7, and changes the ranges in a period of t3 to t4. Namely, the range control circuit 7 fetches an external command signal and switches the output characteristics.

In the range selecting data of two bits, the L-level is set to 0 volt and the H-level is set to 5 volts. In a period of t2 to t3 of FIG. 7, it shows a case in which "01" in binary number is inputted.

Thereafter, in timing of t4, the microcomputer 20 returns the voltage of the first terminal (power source terminal), 40 to 4 volts. Thus, the sensor device side input waiting state is released. The detecting signal output operation is performed after t4.

Fourth Embodiment Mode

A fourth preferred embodiment will now be explained with emphasis on the differences between the first and fourth embodiments.

Figure 8:
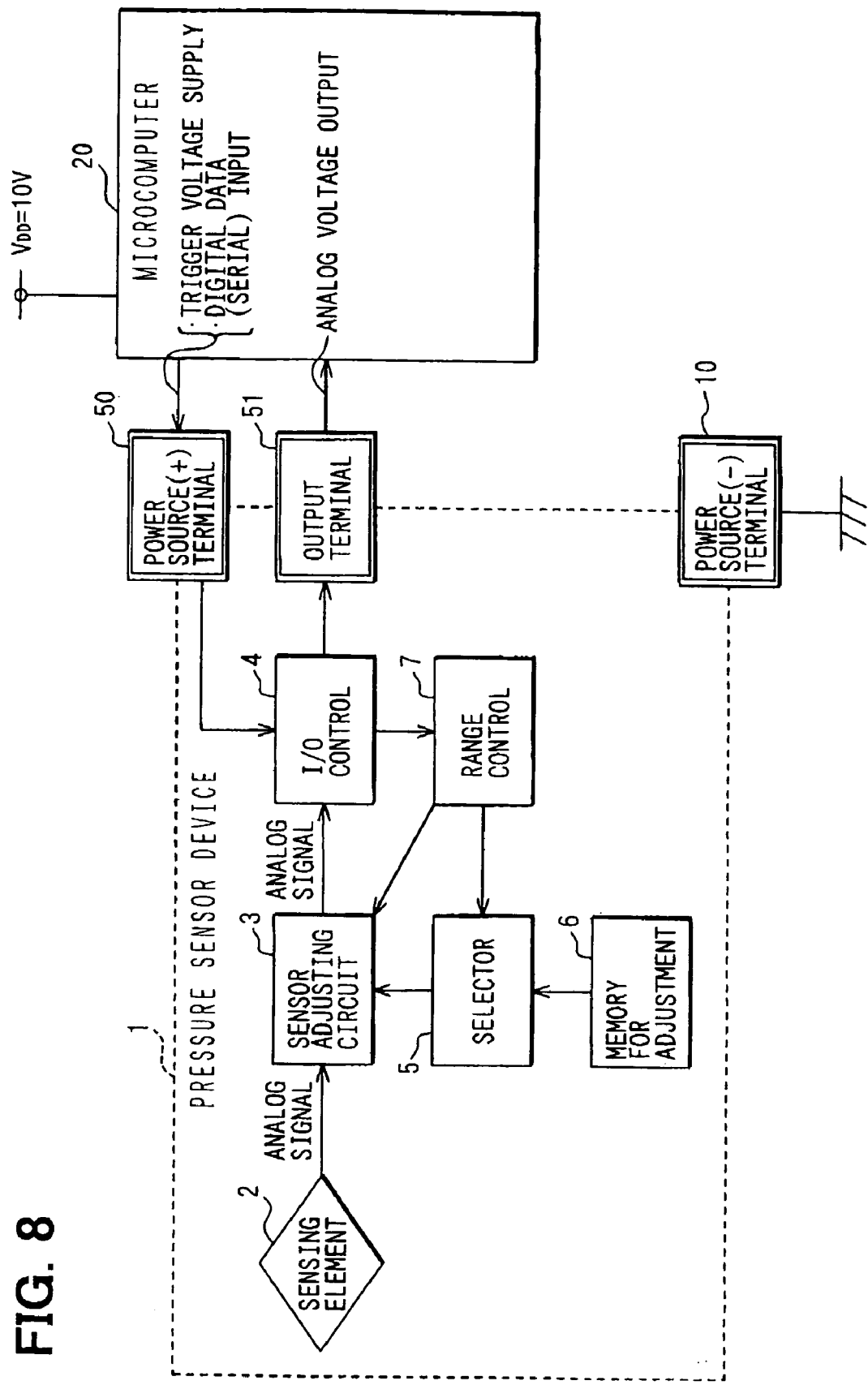
FIG. 8 is a block diagram of the sensor device according to a fourth preferred embodiment.
Figure 9:
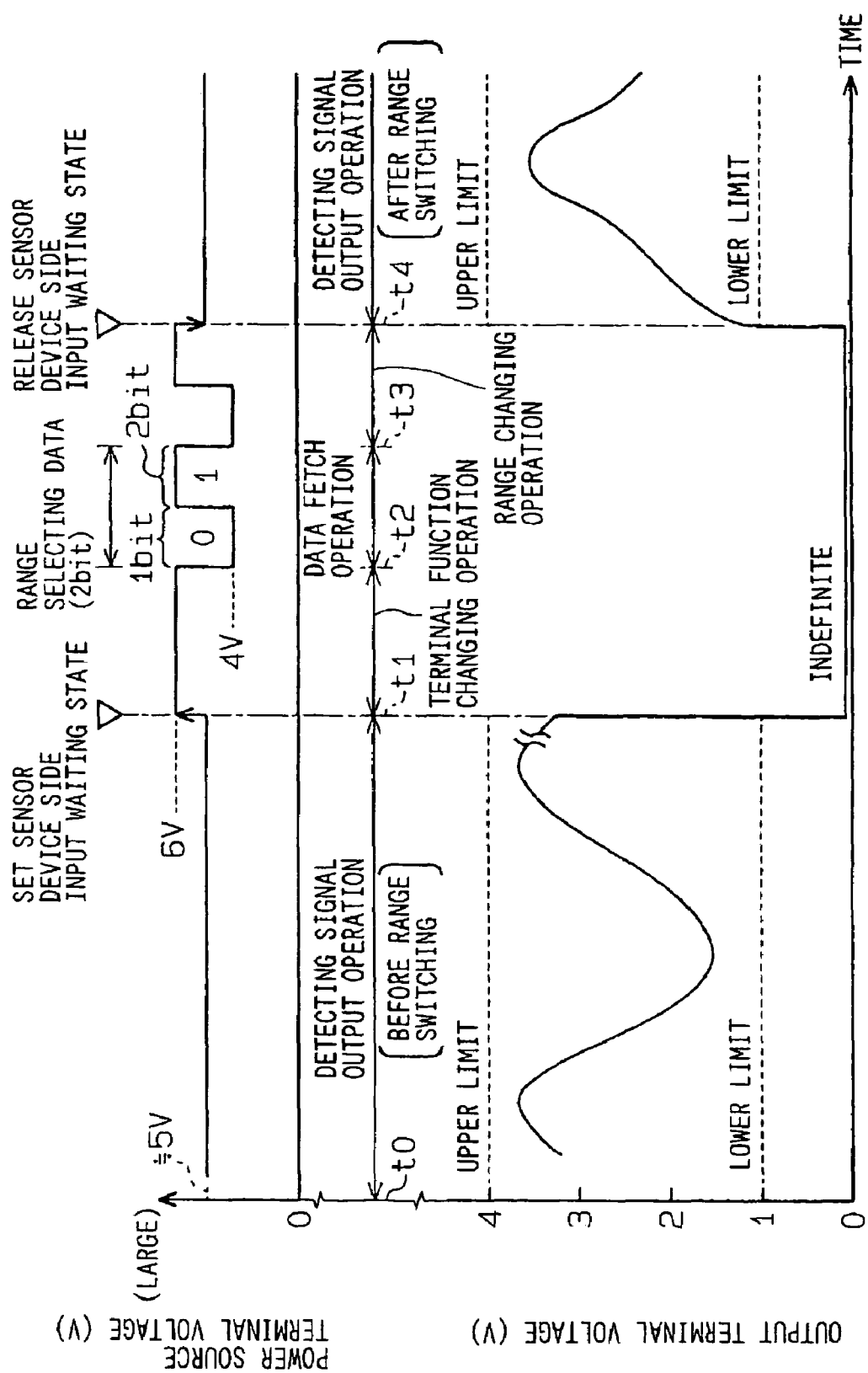
FIG. 9 is a time chart for explaining the operation of a sensor device.
Figure 10:
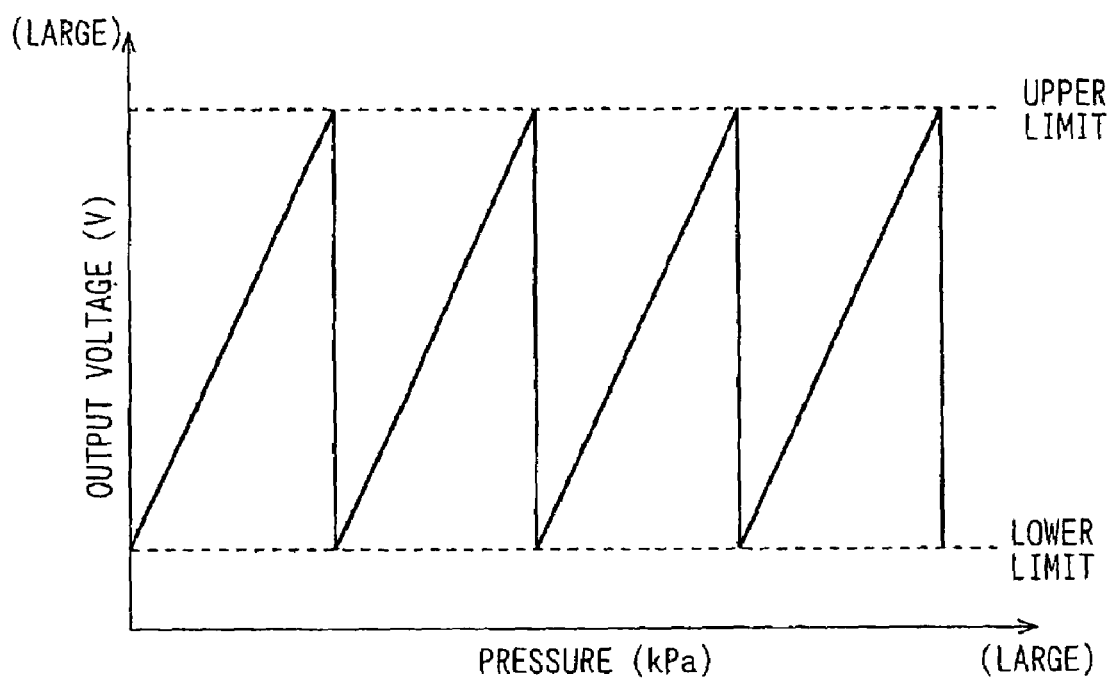
FIG. 10 is a characteristic graph showing the relation between pressure and output voltage for a related art device.

FIG. 8 shows a block diagram of the system according to the fourth embodiment. FIG. 9 shows a corresponding operational time chart.

As shown in FIG. 8, a high voltage side power source terminal (VDD) is connected to a microcomputer 20, and a high voltage side power voltage VDD is set to 10 volts. A first terminal (positive power source terminal) 50 in the pressure sensor device 1 is a terminal for receiving the supply of a power voltage, and is connected to the microcomputer 20. A second terminal (output terminal) 51 in the pressure sensor device 1 is a terminal for outputting a detecting signal provided by a change in voltage component, and is connected to the microcomputer 20.

The axis of ordinate of FIG. 9 shows the voltage at the first terminal (positive power source terminal) 50, and the voltage at the second terminal (output terminal) 51 of FIG. 8.

In a period of t0 to t1 of FIG. 9, the pressure sensor device 1 performs the detecting signal output operation while the pressure sensor device 1 receives the supply of 5 volts as the power voltage from the microcomputer 20 through the first terminal (power source terminal) 50. At this time, an analog voltage is outputted as the detecting signal from the second terminal (output terminal) 51 to the microcomputer 20.

Thereafter, in the timing of t1 of FIG. 9, the microcomputer 20 changes the voltage of the first terminal (power source terminal) 50 from 5 volts to 6 volts. The input-output control circuit 4 as a terminal function changing device of FIG. 8 monitors the voltage value in the first terminal (power source terminal) 50. When the voltage value is dislocated from a predetermined range by changing the voltage value to 6 volts, the input-output control circuit 4 functionally changes the first terminal 50 to a terminal for inputting an external signal in a period of t1 to t2.

After the first terminal 50 is changed to the terminal for inputting the external signal, the range control circuit 7 as an output characteristic switching device fetches range selecting data of two bits through this terminal 50 in a period of t2 to t3, and changes the ranges in a period of t3 to t4. Namely, the range control circuit 7 fetches an external command signal and switches the output characteristics.

In the range selecting data of two bits, the L-level is set to 4 volts, and the H-level is set to 6 volts. In the period of t2 to t3 of FIG. 9, it shows a case in which "01" in binary number is inputted.

Thereafter, in the timing of t4, the microcomputer 20 returns the voltage of the first terminal (power source terminal) 50 to 5 volts. Thus, the sensor device side input waiting state is released. The detecting signal output operation is then performed after t4.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An output characteristic switching method for switching an output characteristic of a sensor device, the sensor device receiving a power supply voltage and outputting a detecting signal during a first sensing interval according to one of a first output characteristic and a second output characteristic, the method comprising:
    switching a function of a terminal of the sensor device from receiving the power supply voltage and outputting the detecting signal to inputting an external command signal during an input interval; and
    switching the output characteristics of the sensor device to an other of the first output characteristic and the second output characteristic during a second sensing interval based on the external command signal received through the terminal during the input interval.

2. The output characteristic switching method of the sensor device according to claim 1, wherein said external command signal is a binary coded digital signal.

3. An output characteristic switching method for switching between a first output characteristic and a second output characteristic of a sensor device having a sensor element and a terminal capable of receiving an input and generating an output during given time intervals, the method comprising:
    providing a power supply voltage input to the terminal and outputting a sensor signal associated with one of the first output characteristic and the second output characteristic from the terminal during a first time interval, the sensor signal associated with values detected by the sensing element, the sensor signal provided by changes in an electric current component of the power supply voltage causing changes in the power supply voltage provided to the terminal;
    interrupting the outputting of the sensor signal at the start of a second interval signaled by applying a constant value of the power supply voltage to the terminal regardless of the changes in the electric current component, and thereby switching the sensor device to an input ready mode; and
    receiving an external command input at the terminal during a third interval, the external command input indicating another of the first output characteristic and the second output characteristic for outputting the sensor signal.

4. The method of claim 3, wherein the external command input includes a binary coded signal indicating a binary code associated with the another of the first output characteristic and the second output characteristic.

5. The method of claim 3, further comprising:
    switching the sensor device such that the outputting the sensor signal is conducted according to the other of the first output characteristic and the second output characteristic.

6. The method of claim 5, wherein the first output characteristic and the second output characteristic include a first range and a second range associated with the values detected by the sensing element.

7. The method of claim 5, wherein the first output characteristic and the second output characteristic include a first range and a second range associated with the values detected by the sensing element; and the method further comprises:
    adjusting a range control device associated with the sensor device to output the other of the first output characteristic and the second output characteristic.

8. A switching method for switching between a first output characteristic and a second output characteristic of a sensor device having a sensor element and a terminal capable of receiving an input and generating an output during given time intervals, the method comprising:
    applying a voltage input to the terminal and outputting a signal associated with one of the first output characteristic and the second output characteristic from the terminal, the signal based on values generated by the sensing element according to a parameter associated with the one of the first output characteristic and the second output characteristic, the values controlling a level of the voltage input at the terminal;
    interrupting the outputting of the signal by dislocating the outputting the signal with a constant value of the voltage at the terminal to thereby switch the sensor device to an input ready mode; and
    receiving an external command input at the terminal while the sensor device is switched to the input ready mode, the external command input indicating another of the first output characteristic and the second output characteristic for outputting the signal.

9. The method of claim 8, wherein the values cause changes in an electric current component of the voltage to thereby cause changes in the voltage provided to the terminal, and the voltage provided at the terminal corresponds to the signal.

10. The method of claim 8, wherein:
    the values generated by the sensing element correspond to changes in an electric current component associated with the voltage; and
    the dislocating the outputting the signal with a constant value of the voltage includes applying a constant value of the voltage to the terminal regardless of the changes in the electric current components.

11. The method of claim 8, wherein the external command input includes a binary coded signal indicating a binary code associated with the another of the first output characteristic and the second output characteristic.

12. The method of claim 8, further comprising:
    switching the sensor device such that the outputting the signal is conducted according to the other of the first output characteristic and the second output characteristic.

13. The method of claim 8, wherein the first output characteristic and the second output characteristic include a first range and a second range associated with the values detected by the sensing element.

14. The method of claim 8, wherein the first output characteristic and the second output characteristic include a first range and a second range associated with the values detected by the sensing element; and
    the method further comprises adjusting a range control device associated with the sensor device to output the other of the first output characteristic and the second output characteristic.

* * * * *